(12) United States Patent
Engberg et al.

(10) Patent No.: US 9,727,954 B2
(45) Date of Patent: Aug. 8, 2017

(54) LOCAL CONTRAST ADJUSTMENT FOR DIGITAL IMAGES

(71) Applicant: Seek Thermal, Inc., Santa Barbara, CA (US)

(72) Inventors: Andreas Engberg, Santa Barbara, CA (US); William J. Parrish, Santa Barbara, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 51 days.

(21) Appl. No.: 14/817,989

(22) Filed: Aug. 4, 2015

(65) Prior Publication Data

US 2016/0042500 A1 Feb. 11, 2016

Related U.S. Application Data

(60) Provisional application No. 62/033,364, filed on Aug. 5, 2014, provisional application No. 62/069,511, filed on Oct. 28, 2014.

(51) Int. Cl.
*G06T 5/00* (2006.01)
*H04N 1/60* (2006.01)
(Continued)

(52) U.S. Cl.
CPC .............. *G06T 5/003* (2013.01); *G06T 5/002* (2013.01); *G06T 5/008* (2013.01); *H04N 1/4092* (2013.01);
(Continued)

(58) Field of Classification Search
CPC ......... G06T 5/003; G06T 5/008; G06T 5/002; G06T 2207/10048; G06T 2207/20192;
(Continued)

(56) References Cited

U.S. PATENT DOCUMENTS 5,200,623 A 4/1993 Cannata
6,140,948 A 10/2000 Yu
(Continued)

FOREIGN PATENT DOCUMENTS

EP 1 083 740 3/2001
EP 1 601 185 11/2005
(Continued)

OTHER PUBLICATIONS

PCT International Search Report and Written Opinion for PCT/US2015/032671 dated Sep. 7, 2015 in 16 pages.
(Continued)

*Primary Examiner* — Albert Cutler
(74) *Attorney, Agent, or Firm* — Knobbe Martens Olson & Bear LLP

(57) ABSTRACT

Edge enhancement of a digital image can include using at least two signal processing paths to adjust a display-formatted pixel value to enhance the appearance of edges in displayed image data. A digital image can be filtered by producing an edge enhancement factor, α, per pixel from at least one look up table (LUT). Digital image data can also be adjusted using at least two signal processing paths, where the image data is adjusted if a pixel value and its neighboring pixel values are all within a smoothing range or where the pixel delta value is outside of a bad pixel range and its neighboring pixel delta values are all within the bad pixel range. In such cases, the image data can be adjusted by replacing the pixel value with an average or median value of the neighboring pixels.

19 Claims, 9 Drawing Sheets

(51) Int. Cl.
  *H04N 1/409* (2006.01)
  *H04N 5/14* (2006.01)
  *H04N 5/232* (2006.01)
  *H04N 5/33* (2006.01)
  *H04N 5/21* (2006.01)

(52) U.S. Cl.
  CPC ........... *H04N 1/6027* (2013.01); *H04N 5/142* (2013.01); *H04N 5/21* (2013.01); *H04N 5/23229* (2013.01); *H04N 5/33* (2013.01); *G06T 2207/10048* (2013.01); *G06T 2207/20192* (2013.01)

(58) Field of Classification Search
  CPC .... H04N 1/6027; H04N 1/4092; H04N 5/142; H04N 5/23229; H04N 5/33; H04N 5/21
  See application file for complete search history.

(56) References Cited

U.S. PATENT DOCUMENTS

| | | |
|---|---|---|
| 6,252,995 B1 | 6/2001 | Takamori |
| 6,730,909 B2 | 5/2004 | Butler |
| 6,757,442 B1 | 6/2004 | Avinash |
| 7,795,578 B2 | 9/2010 | Högasten et al. |
| 7,796,168 B1 | 9/2010 | Kostrzewa et al. |
| 7,982,652 B2 | 7/2011 | Simony et al. |
| 7,995,859 B2 | 8/2011 | Högasten |
| 8,189,050 B1 | 5/2012 | Hughes et al. |
| 8,208,026 B2 | 6/2012 | Högasten et al. |
| 8,208,755 B1 | 6/2012 | Högasten |
| 8,306,275 B2 | 11/2012 | Högasten |
| 8,340,414 B2 | 12/2012 | Högasten et al. |
| 8,373,757 B1 | 2/2013 | Nguyen |
| 8,378,290 B1 | 2/2013 | Speake et al. |
| 8,428,385 B2 | 4/2013 | Whiteside et al. |
| 8,737,760 B2 | 5/2014 | Olsson et al. |
| 8,780,208 B2 | 7/2014 | Högasten et al. |
| 9,332,186 B2 | 5/2016 | Johansson et al. |
| 9,335,352 B2 | 5/2016 | McCrea et al. |
| 2002/0022938 A1 | 2/2002 | Butler |
| 2002/0074499 A1 | 6/2002 | Butler |
| 2005/0157189 A1* | 7/2005 | Sambongi ............ H04N 1/4092 348/241 |
| 2006/0092297 A1 | 5/2006 | Lee et al. |
| 2006/0193509 A1 | 8/2006 | Criminisi et al. |
| 2007/0147698 A1 | 6/2007 | Reid |
| 2008/0278602 A1* | 11/2008 | Otsu ............ H04N 3/1562 348/223.1 |
| 2009/0073278 A1 | 3/2009 | Ogawa et al. |
| 2010/0141768 A1 | 6/2010 | Liberman et al. |
| 2010/0238294 A1 | 9/2010 | Högasten et al. |
| 2011/0115982 A1* | 5/2011 | Otsuka ............ G06T 5/20 348/625 |
| 2011/0141368 A1 | 6/2011 | Wallace et al. |
| 2013/0064449 A1 | 3/2013 | Menikoff |
| 2013/0147966 A1 | 6/2013 | Kostrzewa et al. |
| 2013/0169819 A1 | 7/2013 | Strandemar |
| 2013/0222604 A1 | 8/2013 | Ingerhed et al. |
| 2013/0300875 A1 | 11/2013 | Strandemar et al. |
| 2014/0015921 A1 | 1/2014 | Foi et al. |
| 2014/0016879 A1 | 1/2014 | Högasten et al. |
| 2014/0037225 A1 | 2/2014 | Högasten et al. |
| 2014/0092257 A1 | 4/2014 | Högasten et al. |
| 2014/0092258 A1 | 4/2014 | Dart et al. |
| 2014/0168445 A1 | 6/2014 | Högasten et al. |
| 2014/0247365 A1 | 9/2014 | Gardner et al. |
| 2014/0313343 A1 | 10/2014 | Frank et al. |
| 2014/0313385 A1 | 10/2014 | Sato et al. |
| 2014/0340515 A1* | 11/2014 | Tanaka ............ G06T 5/003 348/143 |
| 2014/0355902 A1 | 12/2014 | Olsson |
| 2014/0355904 A1 | 12/2014 | Olsson |
| 2015/0187144 A1 | 7/2015 | Roth |
| 2015/0310594 A1 | 10/2015 | Olsson |
| 2015/0312488 A1 | 10/2015 | Kostrzewa et al. |
| 2015/0312489 A1 | 10/2015 | Hoelter et al. |
| 2015/0319379 A1 | 11/2015 | Nussmeier et al. |
| 2015/0350567 A1 | 12/2015 | Parrish et al. |
| 2016/0041039 A1 | 2/2016 | Olsson |
| 2016/0042500 A1 | 2/2016 | Engberg et al. |
| 2016/0044306 A1 | 2/2016 | Chahine et al. |
| 2016/0056785 A1 | 2/2016 | Wolfe et al. |
| 2016/0057369 A1 | 2/2016 | Wolfe et al. |
| 2016/0061883 A1 | 3/2016 | Engberg et al. |
| 2016/0156858 A1 | 6/2016 | Lee et al. |
| 2016/0198102 A1 | 7/2016 | Chahine et al. |
| 2016/0202117 A1 | 7/2016 | Hosking |
| 2016/0203694 A1 | 7/2016 | Högasten et al. |
| 2016/0323525 A1 | 11/2016 | Lee |

FOREIGN PATENT DOCUMENTS

| | | |
|---|---|---|
| EP | 1 667 066 | 6/2006 |
| EP | 2 618 560 | 7/2013 |
| EP | 2 645 577 | 10/2013 |
| WO | WO 2013/084809 | 6/2013 |
| WO | WO 2013/191611 | 12/2013 |
| WO | WO 2014/106210 | 7/2014 |

OTHER PUBLICATIONS

PCT International Search Report and Written Opinion for PCT/US042826 dated Oct. 16, 2015 in 12 pages.

PCT International Search Report and Written Opinion for PCT/US043547 dated Oct. 9, 2015 in 11 pages.

PCT International Search Report and Written Opinion for PCT/US045656 dated Oct. 21, 2015 in 12 pages.

Badamchizadeh, et al., Image and Graphics, Comparative Study of Unsharp Masking Methods for Image Enhancement, 2004, pp. 27-30.

PCT International Search Report and Written Opinion for PCT/US2015/063111 dated May 17, 2016 in 13 pages.

Dynamic-range compression and contrast enhancement in infrared imaging systems.

"The Integrator Amplifier," Electronics Tutorials, http://www.electronics-tutorials.ws/opamp/opamp_6.html, accessed Sep. 22, 2016.

* cited by examiner

LOCAL CONTRAST ADJUSTMENT FOR DIGITAL IMAGES

CROSS-REFERENCE TO RELATED APPLICATIONS

This application claims the benefit of priority to U.S. Prov. Pat. App'n No. 62/033,364, entitled "Local Contrast Edge Enhancement for Digital Images," filed Aug. 5, 2014, and to U.S. Prov. Pat. App'n No. 62/069,511, entitled "Local Contrast Adjustment for Digital Images," filed Oct. 28, 2014. Each of the applications referenced in this paragraph is incorporated by reference herein in its entirety.

BACKGROUND

Field

The present disclosure generally relates to systems and methods for signal processing for imaging systems such as cameras including infrared cameras, and in particular to systems and methods for adjusting a displayed digital image based on local contrast (e.g., to enhance edges).

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. Image display is often a desired feature of such IR cameras and therefore image processing aimed at improving the quality of the apparent visual display may be desirable.

SUMMARY

Example embodiments described herein have innovative features, no single one of which is indispensable or solely responsible for their desirable attributes. Without limiting the scope of the claims, some of the advantageous features will now be summarized.

In some embodiments, improved signal processing methods for imaging systems may be provided. The disclosed signal processing methods produce improved image quality by enhancement of edges without significantly amplifying noise in the image, smoothing portions of an image, and/or replacing bad pixel values in the image. The disclosed methods are configured to efficiently use computational and storage resources.

In some embodiments, a method for edge enhancement of a digital image is provided. The method includes receiving at least a portion of image data representative of an array of pixel values, P, the image data acquired with an imaging array. The method includes utilizing a first signal processing path to format the received array of pixel values for display purposes, generating an array of formatted pixel values, $P_d$. The method also includes utilizing a second signal processing path to determine, for each pixel in the received array of pixel values, an average value of neighbor pixels, $P_{ave}$. The method also includes producing an edge enhancement factor, $\alpha$, per pixel in the received array of pixel values from at least one lookup table (LUT) operation, the LUT based on a value of the pixel, P, and at least one of an average of neighbor pixels, $P_{ave}$, or an adjusted pixel value, $\Delta$ (where $\Delta=P-P_{ave}$). In some embodiments, the LUT operation can be based on the pixel value, P, and a normalized, adjusted pixel value, $\Delta/P_{ave}$. The method also includes multiplying each formatted pixel value, $P_d$, by an associated edge enhancement factor, $\alpha$, to derive an enhanced pixel value, $P_e=P_d*\alpha$.

In some embodiments, formatting the received pixel values for display purposes may include Histogram Equalization Based methods (HEBM) and in some of these embodiments, the formatted pixel values may be converted to a grey-scale for display.

In some embodiments, the edge enhancement factor $\alpha$ may be substantially equal to 1 for pixels where an adjusted pixel value, $\Delta$, or a normalized, adjusted pixel value, $\Delta/P_{ave}$, is within a noise range N. In some of these embodiments, the noise range N may be symmetrical about a value, x, and the noise range may be $x \pm N_r$, where $N_r=N/2$. In some of these embodiments, the edge enhancement factor, $\alpha$, may be directly set substantially to 1 if the adjusted pixel value, $\Delta$, or normalized, adjusted pixel value, $\Delta/P_{ave}$, is within the noise range $x \pm N_r$. In certain implementations, the LUT may not contain entries for adjusted pixel values within the noise range N (e.g., no entries in the LUT where $x-N_r<\Delta<x+N_r$). In certain implementations, the value of x can be 0 or 1. In some implementations, the LUT operation can be based on 1 plus an adjusted pixel value or normalized, adjusted pixel value (e.g., LUT(P, $1+\Delta$) or LUT(P, $1+\Delta/P_{ave}$)).

In some embodiments, the noise range N may be configured to discriminate between noise and true edges in the image data. In some embodiments, the value $N_r$ may be between 1 and 10 counts. For example, the value $N_r$ can be 5 counts. In certain implementations, the value $N_r$ can be different for different pixels in the image data.

In some embodiments, the edge enhancement factor, $\alpha$, may be set to a constant if the adjusted pixel value, $\Delta$, is outside an enhancement limit range M (e.g., the edge enhancement factor $\alpha$ does not change with changing values of $\Delta$ outside the range M). In some of these embodiments, the enhancement limit range M may be symmetrical about a value, x, and the range may be $x \pm M_r$. In some embodiments, $\alpha$ may be directly set substantially to a constant if the adjusted pixel value, $\Delta$, is outside the enhancement limit range $x \pm M_r$. In some implementations, the LUT may not contain entries for adjusted pixel values outside the enhancement limit range (e.g., no entries in the LUT where $\Delta<x-M_r$ and $\Delta>x+M_r$). In certain implementations, the value of x can be 0 or 1.

In some embodiments, the normalized, adjusted pixel value, $\Delta/P_{ave}$, may be used instead of the adjusted pixel value, $\Delta$.

In some embodiments, the method also includes utilizing the second signal processing path to convert the array of pixel values, P, to 32-bit fixed point format for processing in fixed point arithmetic. In certain embodiments, the method also includes looking up values of $1/P_{ave}$ in a first LUT, calculating $\Delta/P_{ave}$, and, in some implementations, adding 1 to $\Delta/P_{ave}$. The method can also include looking up values of the edge enhancement factor, $\alpha$, corresponding to $1+\Delta/P_{ave}$ and/or $\Delta/P_{ave}$ in a second LUT.

In some embodiments, the edge enhancement factor, $\alpha$, can be configured to have a value between 0.25 and 4. For example, the edge enhancement factor, $\alpha$, may be set to a value within a range from 0.25 to 1 for negative values of an adjusted pixel value, $\Delta$, and to a value within a range from 1 to 4 for positive values of an adjusted pixel value, $\Delta$, for a total range from 0.25 to 4. In particular embodiments, the edge enhancement factor, $\alpha$, can be configured to have a value between 0.5 and 2.

In some embodiments, the method includes replacing at least one of a pixel value, P, or display-formatted pixel value, $P_d$, with at least one of the average or the median of surrounding or neighbor pixels if the adjusted pixel value, $\Delta$, is within a smoothing range S and the adjusted pixel value, $\Delta$, for each of the surrounding or neighbor pixels is also within the smoothing range S.

In some embodiments, a method for identifying and replacing pixel values for misbehaving pixels includes replacing the pixel value with the average or median of surrounding or neighbor pixels if the adjusted pixel value, $\Delta$, is outside a bad pixel range B and the adjusted pixel value, $\Delta$, for each of the surrounding or neighbor pixels is within the bad pixel range B.

In some embodiments, the imaging array is an infrared focal plane array (IR FPA) in a thermal imaging camera.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
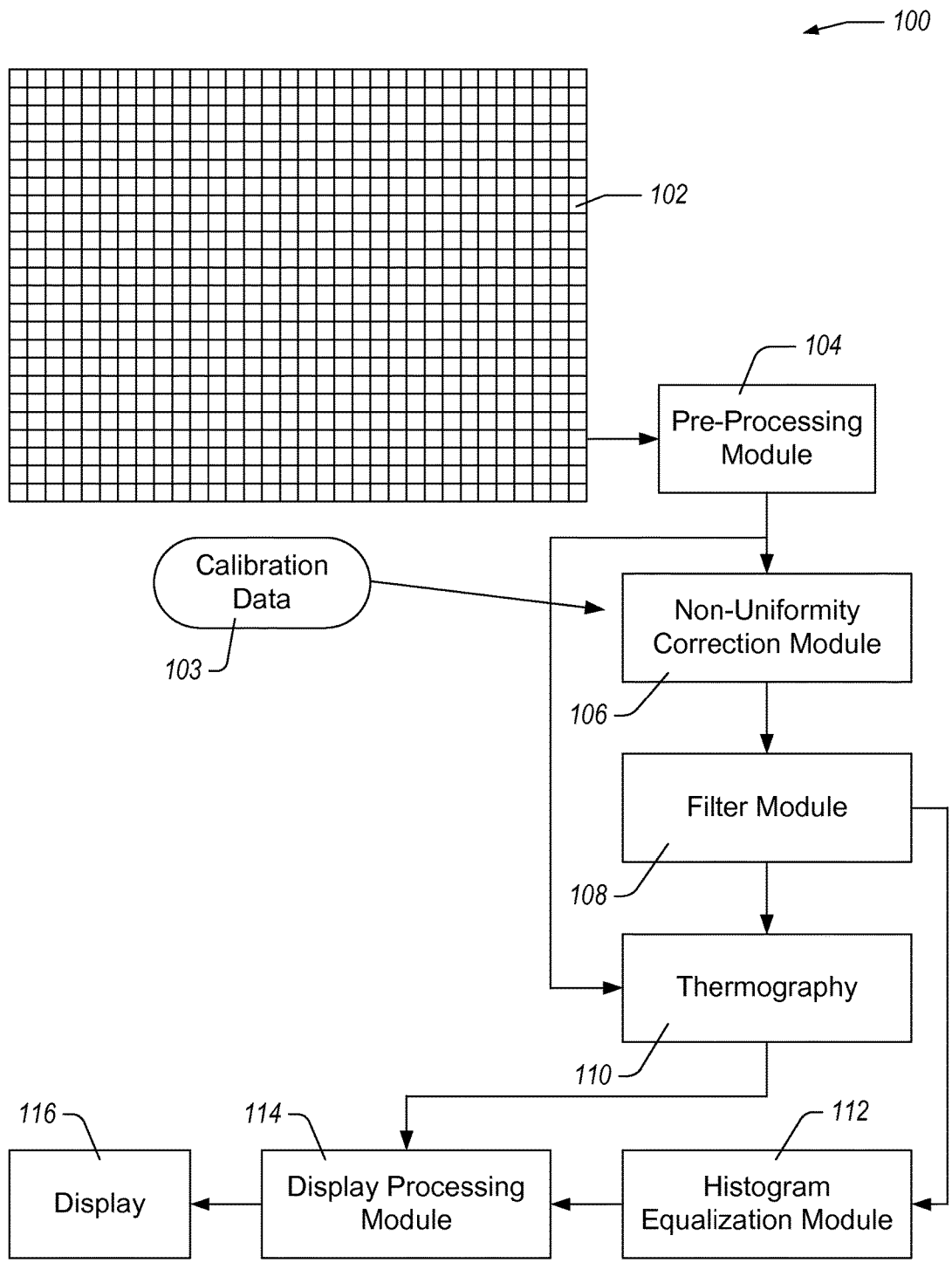
FIG. 1A illustrates a functional block diagram of an example imaging system.

Generally described, aspects of the present disclosure relate to using local contrast data (e.g., pixel value differences for pixels that are near one another) to adjust image data. Adjusting the image data includes enhancing edges present in the image data, smoothing portions of an image, and identifying and replacing potentially bad pixel data. The present disclosure includes systems and methods configured to determine local contrast data by comparing pixel data to surrounding pixel data. To enhance edges in image data, the systems and methods systematically process pixels to determine an appropriate or suitable edge enhancement factor to apply to image data formatted for display. To smooth portions of image data, the systematic processing of pixels can be used to verify that a pixel is in a region of relatively low contrast and, when that is the case, to replace that pixel data with a value determined from values of surrounding pixels. To identify and replace bad pixel data, the systematic processing of pixels can be used to verify that a pixel has a value that is outside a tailored range of values and, when that is the case, to replace that pixel data with a value determined from values of surrounding pixels. These systems and methods utilize parallel processing paths to format data for display and to determine image adjustment parameters. These systems and methods also utilize lookup tables to determine image adjustment parameters, reducing memory and processor utilization. Due at least in part to the utilization of parallel processing paths and to the use of lookup tables, an imaging system can perform the disclosed image adjustments in a computationally efficient manner, where computationally efficient can be used to refer to an efficient use of memory and/or an efficient use of processor cycles.

Although examples and implementations described herein focus, for the purpose of illustration, on processing images acquired with an imaging sensor on board the imaging system, one skilled in the art will appreciate that the techniques described herein may be applied to other image processing systems. For example, the techniques may be used with other image processing systems where it is advantageous to achieve the described image adjustments in a computationally efficient manner. Such image processing systems may be implemented to process large quantities of images quickly, to provide real time or near real time image adjustments to images, or to provide a method of adjusting images in a background process that does not significantly utilize computational resources dedicated to other prioritized processes. In addition, some example embodiments disclosed herein focus on implementation in an infrared camera core using a focal plane array. However, the systems and methods disclosed herein can be implemented in digital and/or video cameras that acquire visible light using a variety of image sensors. Various aspects of the disclosure will now be described with regard to certain examples and embodiments, which are intended to illustrate but not limit the disclosure.

The systems and methods disclosed herein generally relate to increasing image quality in a computationally efficient manner. This may be advantageous for imaging systems where computational resources are at a premium. For example, mobile digital imaging systems may have significant restraints on computational resources such as processing power, power consumption, and/or system memory. Thus, it may be advantageous to adjust acquired images in a computationally efficient manner. In some embodiments, this can enable, for example, real time or near real time image processing. For example, the disclosed image processing techniques can be accomplished on a frame to frame basis. This can mean that the image processing on particular frame of image data is processed before the next image frame is acquired or received. Thus, the image frames can be updated in real time such that processing of image frames occurs at a rate that is at least as fast as the frame rate of the associated imaging system. Advantageously, such imaging systems can thus be able to improve images displayed to a user, such as on a viewfinder of the imaging system or other similar display. The improved images may also be stored for later review.

Accordingly, some embodiments described herein are configured to reduce noise and efficiently use computational and data storage resources to enhance edges in image data to improve image quality for digital images. For example, this can be done to display images with enhanced edges to a user in a viewfinder in real time or near real time (e.g., acquired images can be adjusted and displayed to a user close in time to acquisition or at a rate that matches or exceeds the frame rate of the imaging system).

Some embodiments described herein may improve processing efficiency by replacing computationally extensive steps such as division with LUT operations. Processing efficiency may also be improved by converting integer values to floating point values. Processing efficiency may also be improved by linearly translating values so that they are not centered generally around 0.

Some embodiments described herein may provide for relatively compact lookup tables by eliminating elements from lookup tables for ranges where an edge enhancement factor is configured to be constant. For example, LUTs can be configured to include output values for the edge enhancement factor for one or more tailored ranges of input values. For input values outside of these tailored ranges, the LUT can be bypassed and the system can use a constant value for the edge enhancement factor. In certain implementations, the constant value of the edge enhancement factor can depend on where the input values are in relation to the tailored ranges (e.g., a first edge enhancement factor for input values below a tailored range, a second edge enhancement factor for input values between two tailored ranges, a third edge enhancement factor for input values above a tailored range, etc.). By bypassing or eliminating the LUT operation in such circumstances, computational efficiency can be increased.

Some embodiments described herein may provide edge enhancement with reduced or minimized noise amplification by not enhancing the edges for regions of an image where pixel difference from neighbors is less than a tailored noise threshold. For example, the tailored noise threshold can be configured to determine whether to adjust pixel values using an edge enhancement factor. If a pixel is determined to be within the noise threshold, the edge enhancement process can leave the pixel unadjusted. If, however, a pixel is determined to be outside the noise threshold, the edge enhancement process can boost or reduce the pixel value. The effect can be that pixels that are associated with edges in image data can be adjusted to enhance the appearance of edges in displayed images with little or no amplification of noise in the displayed images.

The disclosed methods (e.g., edge enhancement, low pass filters, bad pixel replacement, etc.) may be implemented as modules that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store a computer program and look-up tables (LUTs) may be implemented along with discrete circuit components to carry out one or more of the methods described herein. In certain implementations, the disclosed methods may be implemented in conjunction with a focal plane array (FPA) on a camera core, wherein the processor and memory components executing the disclosed methods may be on a device mated to the camera core, such as a mobile appliance including smart phones, tablets, personal computers, etc.

As a particular example of some advantages provided by the disclosed systems and methods, an imaging system can include a focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, P, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display so that a user can visually see temperature differences in a scene. Improving the quality of the image displayed in the visual display using the disclosed systems and methods leads to the desirable result of a user being able to visually identify regions of differing temperature in a scene.

Example Imaging Systems

FIG. 1A illustrates a functional block diagram of an imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. Prov. App. No. 62/039,579, entitled "Gain Calibration for an Imaging System," filed Aug. 20, 2015, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments. The following modules are described to illustrate the breadth of functionality available to the disclosed imaging systems and not to indicate that any individual module or described functionality is required, critical, essential, or necessary.

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. Prov. App. No. 62/039,566, entitled "Adaptive Adjustment of the Operating Bias of an Imaging System," filed Aug. 20, 2014, the entire contents of which is incorporated by reference herein.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived by intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter. Additional examples of systems and methods for non-uniformity correction are provided in U.S. Prov. App. No. 62/033,374, entitled "Time Based Offset Correction for Imaging Systems," filed Aug. 5, 2014, the entire contents of which is incorporated by reference herein.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. Prov. App. No. 62/086,305, entitled "Image Adjustment Based on Locally Flat Scenes," filed Dec. 2, 2014, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace pixel data with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in greater detail herein with reference to FIGS. 2A to 9.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. Prov. App. No. 62/043,005, entitled "Image Display and Thermography for a Thermal Imaging Camera," filed Aug. 28, 2014, the entire contents of which is incorporated by reference herein.

The image processing system 100 includes a histogram equalization module 112, or other display conversion module, configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on portions of the image where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words. For instance, the sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. Prov. App. No. 62/049,880, entitled "Selective Color Display of a Thermal Image," filed Sep. 12, 2014, the entire contents of which is incorporated herein by reference in its entirety.

The display 116 can be configured display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
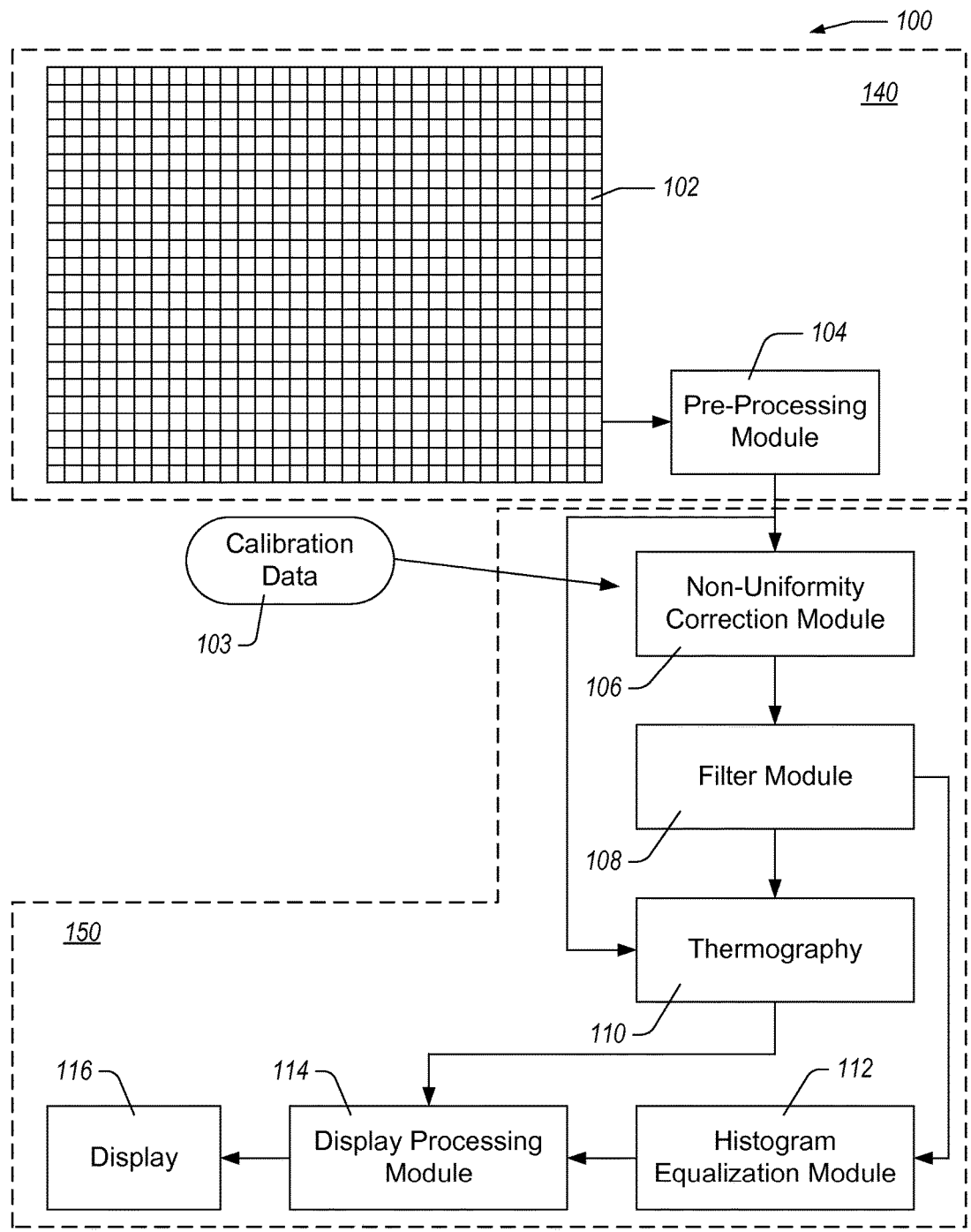
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a mobile electronic device 150. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the mobile electronic device 150 can be included in the camera 140 instead of in the mobile electronic device 150. In some embodiments, certain advantages are realized based at least in part on the division of functions between the camera 140 and the mobile electronic device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the mobile electronic device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the mobile electronic device 150 (e.g., in the thermography module 110).

An output of the camera 140 can be a stream of digital data representing pixel values provided by the pre-processing module 104. The data can be transmitted to the mobile electronic device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The mobile electronic device 150 can be a smartphone, tablet, laptop, or other similar portable electronic device. In some embodiments, power is delivered to the camera 140 from the mobile electronic device 150 through the electrical connectors and/or cables.

The imaging system 100 can be configured to leverage the computing power, data storage, and/or battery power of the mobile electronic device 150 to provide image processing capabilities, power, image storage, and the like for the camera 140. By off-loading these functions from the camera 140 to the mobile electronic device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the mobile electronic device 150 to perform image processing, data storage, and the like.

Example Edge Enhancement Systems and Methods

Figure 2A:
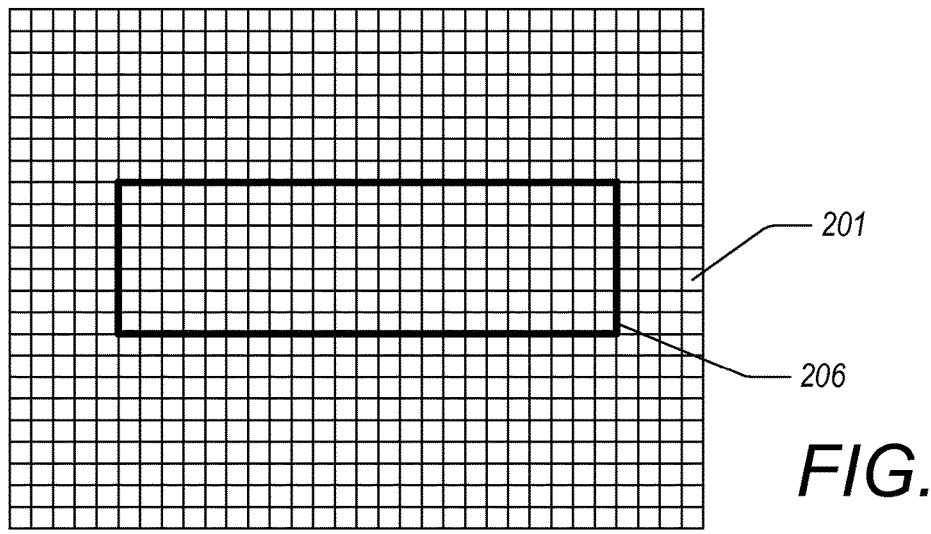
FIGS. 2A-2C illustrate a concept of edge enhancement in an image.
Figure 2B:
Figure 2C:
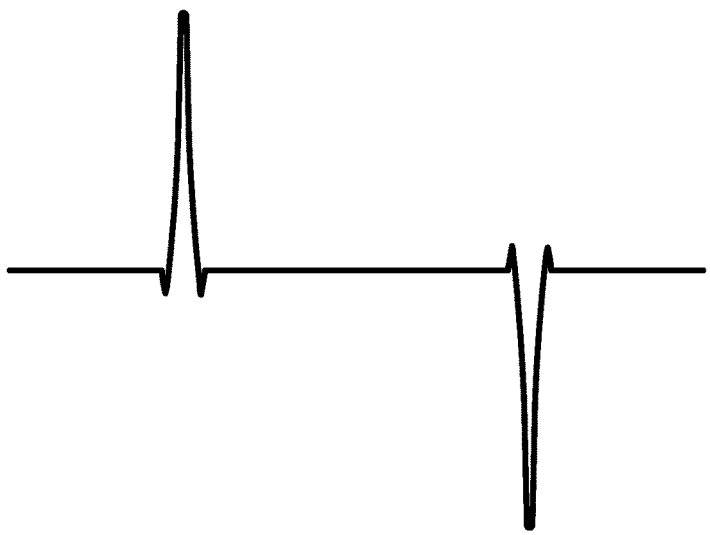

Enhancement of edges in a scene may be useful to improve local visual contrast in a display. FIG. 2A illustrates an image sensor, such as a focal plane array (FPA) 201 configured to image a scene 206 with clearly defined edges. FIG. 2B illustrates an example of looking at the pixel data acquired with the FPA 201 in one dimension to show the edges of the scene 206. FIG. 2C illustrates an example of edges enhanced through application of a digital high pass filter on the pixel data from the FPA 201. Application of the digital high pass filter enhances the edges in the scene 206 and downplays the pixel data with little variation.

Figure 3:
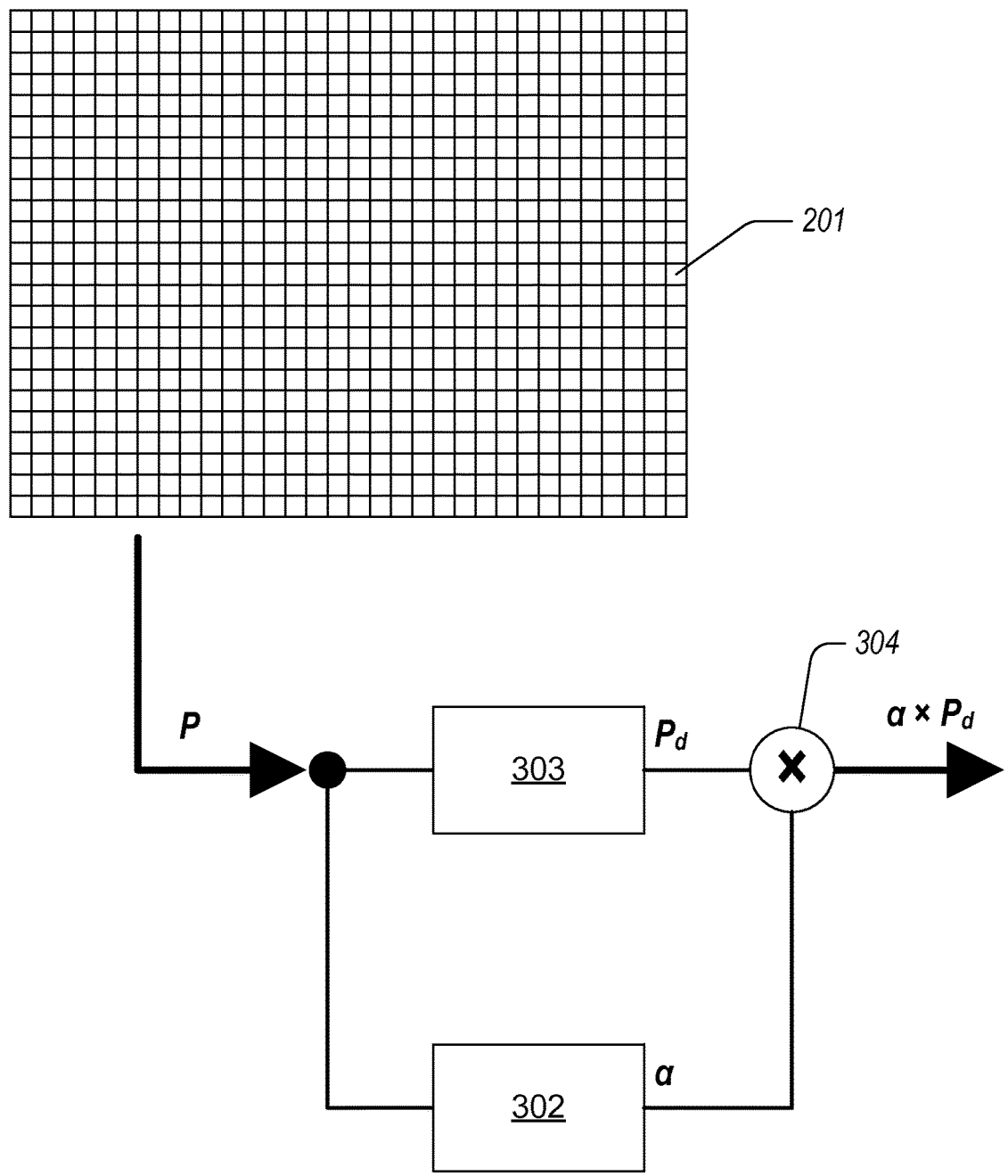
FIG. 3 illustrates a block diagram of an edge detection process, according to an illustrative embodiment.

An approach for implementing a digital high-pass filter may be to develop a process for producing an edge enhancement factor, $\alpha$, that may be used multiplicatively to selectively boost or diminish pixel data for the purpose of edge enhancement. FIG. 3 illustrates an illustrative embodiment of such a process. FPA 201 produces frames of image data, each pixel from each image frame represented as a digital word with value P. As described in co-pending application Ser. No. 14/292,124 titled "Data Digitization and Display for an Imaging System," to Parrish et al. which is incorporated herein by reference in its entirety, the pixel values P may not be displayed directly on a visual display, but may first be processed by a frame-wide process to produce image compatible data. For example, such functionality may be implemented in a histogram equalization module 112, described herein with reference to FIG. 1A.

Returning to FIG. 3, the digital pixel data from the FPA 201, P, may be directed onto two signal processing paths. On a first signal processing path, a display formatting module 303 can be configured to convert the pixel data from the FPA 201, P, into a visual display format, $P_d$. In some embodiments, the display formatting module 303 can operate on many or all pixels from a complete image frame from the FPA 201. In some embodiments, the pixel data, P, from the FPA 201 can comprise an array of 14-bit digital words representing intensity. In some embodiments, the visual display format, $P_d$, can be grey scale. In some embodiments, the display formatting module 303 can implement a histogram equalization based method (HEBM), as described herein with reference to the histogram equalization module 112 described with reference to FIG. 1A. The output of the display formatting module 303 can be an array of display-formatted pixels, $P_d$. For example, the display-formatted pixels can be formatted in grey scale. The display-formatted pixels can be configured to be suitable for display on a monitor, screen or other visual display.

On a second signal processing path, an edge enhancement factor module 302 can be configured to receive pixel data from the FPA 201, P, and to output an edge enhancement factor, α. The edge enhancement factor, α, can be used to adjust the display-formatted pixel data, $P_d$, to provide edge enhancement to the displayed pixels. For example, a combination module 304 can be configured to multiply the edge enhancement factor, α, with the display-formatted pixel data, $P_d$, before the pixel data is displayed to provide local visual edge enhancement. The edge enhancement factor module 302 can be a part of the filter module 108, described herein with reference to FIG. 1A. The combination module 304 can be a part of the histogram equalization module 112, described herein with reference to FIG. 1A.

As described herein, the pixel data from the FPA 201 can be sent along at least two signal processing paths. The at least two signal processing paths can enable parallel processing of image data, but parallel processing of the data is not required. For example, both the first and second signal processing paths can be configured to deliver pixel data to the display formatting module 303 and the edge enhancement factor module 302, respectively. The display formatting module 303 can deliver display-formatted pixel data to the combination module 304 along the first signal processing path and the edge enhancement factor module 302 can deliver the edge enhancement factor to the combination module 304 along the second signal processing path where the combination module 304 adjusts the display-formatted pixel data using the edge enhancement factor and outputs adjusted display-formatted pixel data. In some embodiments, the display formatting module 303 and the combination module 304 are implemented as a single module (e.g., the histogram equalization module 112 described with reference to FIG. 1A) configured to receive pixel data from the FPA 201 and the edge enhancement factor from the edge enhancement factor module 302 and to output adjusted display-formatted pixel data. In such an implementation, processing along the first and second signal processing paths does not necessarily occur in parallel.

The disclosed modules (e.g., edge enhancement factor module 302, display formatting module 303, combination module 304, and the other modules described herein) may be implemented using hardware, software, or a combination of hardware and software. For example, processes associated with the disclosed modules can be implemented as computer-executable instructions or using digital logic. The modules may be implemented using one or more of any of a variety of analog and/or digital discrete circuit components (transistors, resistors, capacitors, inductors, diodes, etc.), programmable logic, microprocessors, microcontrollers, application-specific integrated circuits, or other circuit elements.

Figure 4A:
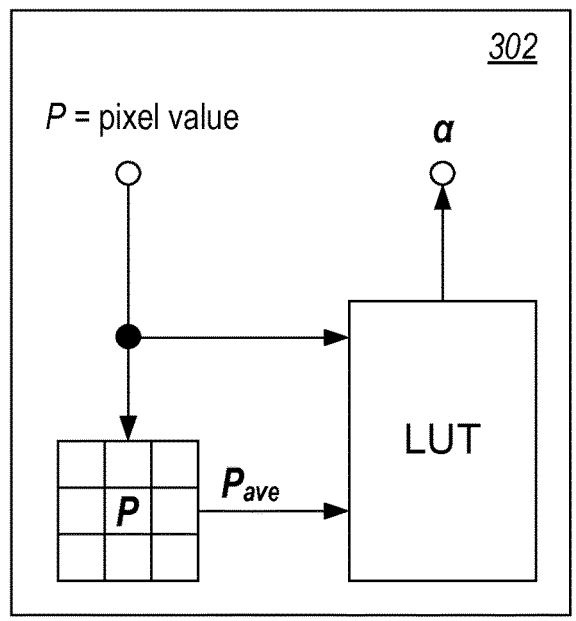
FIGS. 4A and 4B illustrate functional diagrams of methods of producing an edge enhancement factor, according to illustrative embodiments.
Figure 4B:
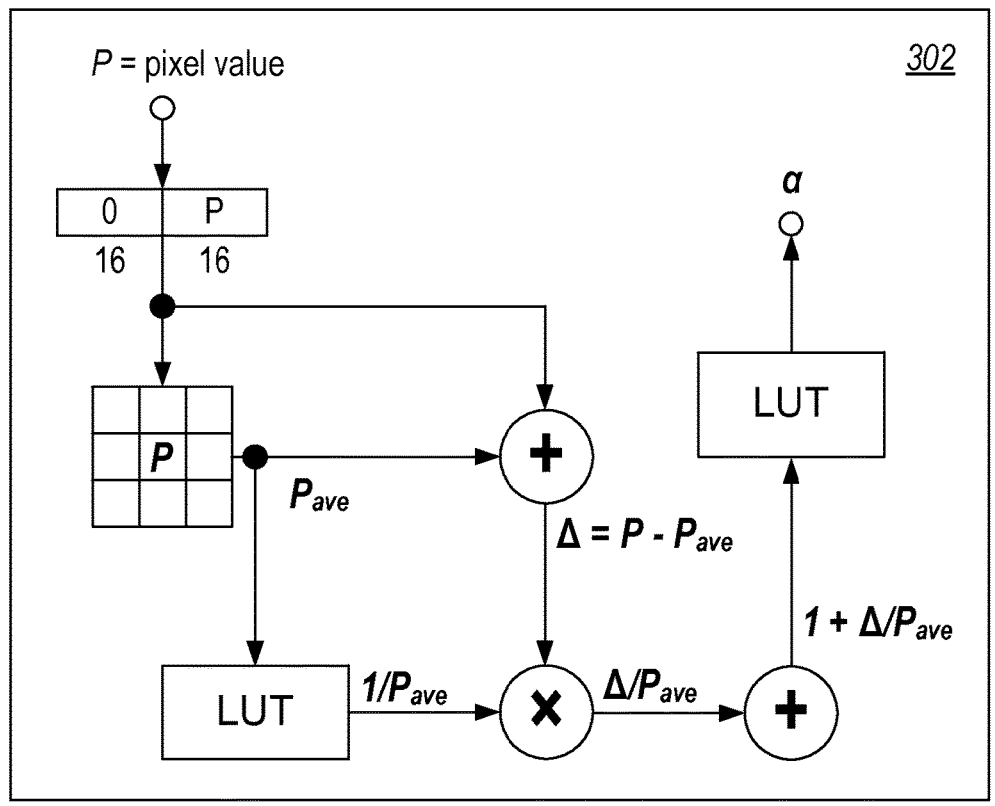

FIGS. 4A and 4B illustrate block diagrams of example implementations of the edge enhancement factor module 302. The relation of a pixel P to the pixels surrounding or near it can be indicative of the presence of an edge in the image data. For example, if a value of pixel P is substantially different (e.g., beyond a fixed or variable tailored threshold) from the values of the pixels surrounding it, there may be an edge structure in the imaged scene locally about pixel P. Thus, knowledge of the value of pixel P and a value indicative of the surroundings can be used to generate an edge enhancement factor, α. For example, as illustrated in FIG. 4A, the edge enhancement factor module 302 can receive pixel data and use that data to determine an edge enhancement factor for a pixel by accessing a lookup table of edge enhancement factors. In some embodiments, the edge enhancement factor module 302 computes the averaged value of the immediate, surrounding, adjacent, near, or another group of nearby pixels $P_{ave}$. Surrounding pixels may be adjacent or nearly adjacent to the pixel of interest, and may include pixels within a tailored distance of the pixel P. For example, in a rectangular grid of pixels, surrounding or adjacent pixels can include all pixels that share a side with the pixel of interest, that share a corner with the pixel of interest, and/or pixels that share a side or a corner with any of the pixels that share a side or corner with the pixel of interest. Surrounding or neighboring pixels may also include pixels that are within a tailored radius of a pixel of interest, but the surrounding or neighboring pixels need not be symmetric about the pixel of interest. In some embodiments, $P_{ave}$ is the average of the nearest neighbors to Pixel P. The edge enhancement factor module 302 can include a lookup table (LUT) that uses P and/or $P_{ave}$ as input and that provides the edge enhancement factor, α, as an output. In certain embodiments, the LUT can use the value $\Delta = P - P_{ave}$, a value indicative of the edge amplitude, as input.

Figure 5:
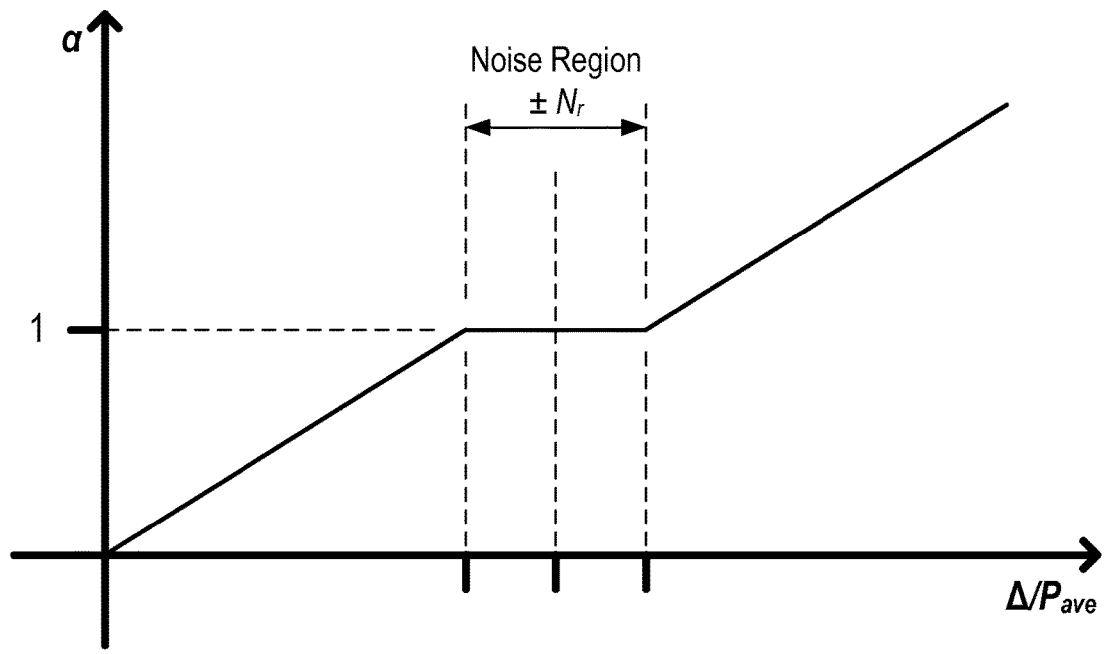
FIG. 5 illustrates an example relationship between the edge enhancement factor and normalized, adjusted pixel values, according to an illustrative embodiment.

The values of the edge enhancement factor, α, may depend at least in part on a targeted degree of edge enhancement for a particular imaging system. For example, different imaging systems can be configured to have tailored edge enhancement factors configured to achieve targeted results and accounting for properties of the particular imaging system. FIG. 5 illustrates a particular example of the edge enhancement factor, α, as a function of $\Delta/P_{ave}$, or the value Δ normalized by the average of nearby pixel values. This can be done to dampen the contrast enhancement for very high scene contrast regions, for example. As a particular example, the edge enhancement factor, α, is applied to display-formatted image data, such as grey-scale data. For example, the grey-scale data can be configured to represent individual pixel values as 8-bit digital words where a value of 0 corresponds to dark portions of a scene and a value of 255 corresponds to bright portions of a scene, with intensity values being represented in 256 discrete steps. Thus for negative values of $\Delta/P_{ave}$, corresponding to negative edges, the edge enhancement factor, α, may be a value between 0 and 1, so that the display-formatted pixel value of a negative edge is reduced, corresponding to a darkening of negative edges when the image data is displayed. Similarly, for positive values of $\Delta/P_{ave}$, corresponding to positive edges, the edge enhancement factor, α, may be a value greater than 1, so that the display-formatted pixel value of a positive edge is increase, corresponding to a brightening of positive edges when the image data is displayed.

One issue with traditional high-pass filters is that they also tend to enhance noise along with edges, as well as introduce image artifacts in areas of an image where the intensity is relatively constant. In some embodiments, the LUT can be configured to output an edge enhancement factor configured to reduce or minimize the enhancement of noise. For example, FIG. 5 illustrates the edge enhancement factor as a function of $\Delta/P_{ave}$ wherein the function includes a noise region where the edge enhancement factor is set to 1 (e.g., no edge enhancement where the edge enhancement factor is a multiplicative enhancement factor). It should be noted that the edge enhancement factor can be a function of $\Delta/P_{ave}$, Δ, $1+\Delta/P_{ave}$, or the like. If $\Delta/P_{ave}$ is small (e.g., near 0), it is likely that no edge is present. For example, small variations in intensity or noise may cause small variations in $\Delta/P_{ave}$. Thus, a noise region N can be defined wherein a value of $\Delta/P_{ave}$ that lies within the noise region results in no edge enhancement (e.g., α=1 for multiplicative edge enhancement factors). In some embodiments, the noise region may be defined as a region $\pm N_r$ around $\Delta/P_{ave}=0$. The transfer function illustrated in FIG. 5 has the effect of enhancing regions where significant variation exists without affecting regions where small variations exist. This has the effect of generally not amplifying noise in image data. In some embodiments, $N_r$, may be chosen to be a few counts of the full digital word, P. For example, the noise region can be in the range of about 1 to about 10 counts for some examples and set at 5 counts in others.

Figure 6:
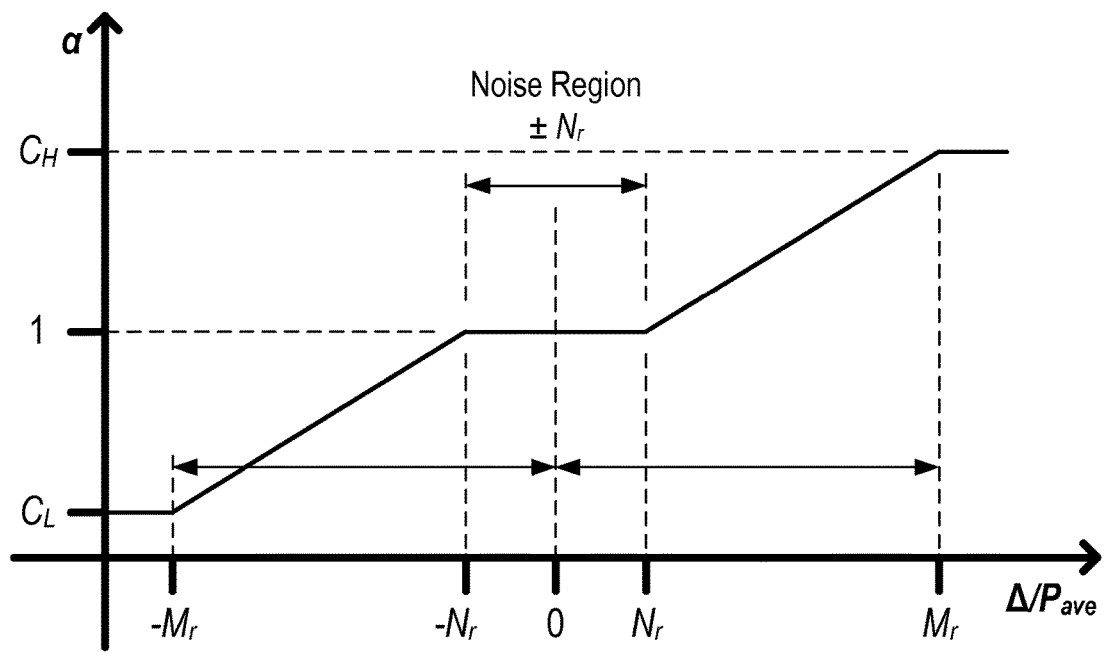
FIG. 6 illustrates an example relationship between the edge enhancement factor and normalized, adjusted pixel values, according to alternative embodiments.

In some embodiments, when $\Delta$ or $\Delta/P_{ave}$ is large, further increasing a may not provide improved image contrast. Accordingly, it may be advantageous to limit the edge enhancement factor. FIG. 6 illustrates an example transfer function that uses a lower and upper limit for the edge enhancement factor outside of a tailored enhancement limit region, M. In some embodiments, the tailored range can be symmetrical about zero, $\pm M_r$. For example, the LUT can be configured so that when $\Delta/P_{ave} < -M_r$ or when $\Delta/P_{ave} > +M_r$, the output edge enhancement factor does not change with changing values of $\Delta/P_{ave}$. For example, the edge enhancement factor, $\alpha$, can be set to a first constant value (e.g., a lower value) when $\Delta/P_{ave} < -M_r$ and to a second constant value (e.g., an upper value) when $\Delta/P_{ave} > M_r$. Thus, the LUT can be configured to implement both a noise region to reduce or minimize amplification of noise and enhancement limits. This is seen in the transfer function illustrated in FIG. 6 where the lower and upper constant values ($C_L$ and $C_H$) of the edge enhancement factor, $\alpha$, are configured to be the value of the edge enhancement factor when $\Delta/P_{ave}$ is equal to respectively $-M_r$ and $+M_r$. In some embodiments, the edge enhancement factor, $\alpha$, can be set to $C_L$ when $\Delta/P_{ave} \le -M_r$, increase from $C_L$ to 1 when $\Delta/P_{ave}$ is between $-M_r$ and $-N_r$, set to $C_H$ when $\Delta/P_{ave} > +M_r$, and decrease from $C_H$ to 1 as $\Delta/P_{ave}$ decreases from $+M_r$ and $+N_r$. Additional regions may be provided with other slopes in alternative embodiments.

In some embodiments, memory space for the LUT may be saved or conserved, such as for the cases illustrated in FIGS. 5 and 6, using one or more techniques. For example, for the cases where the edge enhancement factor, $\alpha$, is a constant and/or 1, the edge enhancement factor, $\alpha$, may be set directly for the known cases without accessing the LUT rather than use up memory space in the LUT. In some embodiments, only values corresponding to the variable portions of the range of a are stored in the LUT. In some embodiments, edge enhancement is accomplished when the range of $\alpha$ stored in the LUT is between about 0.25 and about 4 and in a particular example between about 0.5 and about 2.

As described herein, the LUT can use a normalized adjusted pixel value (e.g., normalized relative to $\Delta/P_{ave}$) as input. In some embodiments, a simpler approach may be implemented where the adjusted pixel value $\Delta$ is not normalized. This approach may also produce suitable edge enhancement results. One particular advantage of this approach is that it eliminates a division step (e.g., determining $\Delta/P_{ave}$ compared to determining $\Delta$). Advantageously, this may simplify the generation of the LUT(s) and speed up calculations made during operation.

FIG. 4B illustrates another example implementation of the edge enhancement factor module 302. First, the edge enhancement factor module 302 converts P, a digital word (e.g., a 14-bit digital word) to 32-bit fixed point format. Fixed point arithmetic can be particularly efficient and fast on many processors. Then the edge enhancement factor module 302 computes $P_{ave}$ ave along a first processing path and on a second processing path computes $\Delta$ (where $\Delta = P - P_{ave}$). In some implementations, a normalized $\Delta$ value can be used. To efficiently determine this normalized value, $1/P_{ave}$ may be produced using a LUT, because using LUTs is generally more efficient than a divide step for many processors. Then the edge enhancement factor module 302 computes $\Delta/P_{ave}$. For some processors arithmetic around zero may not be less efficient than arithmetic around 1. Accordingly, 1 may be added to $\Delta/P_{ave}$ to generally center the result around 1 rather than around 0. Then the edge enhancement factor module 302 determines a by accessing a second LUT as a function of $1+\Delta/P_{ave}$. The LUTs can be configured as described herein. For example, the LUTs can include a noise region, N, and/or an enhancement limit region, M.

Thus, in some embodiments, systems and methods for edge enhancement are disclosed that may limit or minimize noise amplification. The disclosed systems and methods may be highly efficient in terms of processor resources, speed, and memory allocation. For instance, the LUTs may be at most a few 10's of kilobytes in size, and processor operations may be selected for speed.

Depending on the system architecture, the LUTs may be produced in a variety of ways. For example, the LUTs can be pre-calculated and pre-loaded into permanent memory, or they could be calculated at system start-up.

Figure 7:
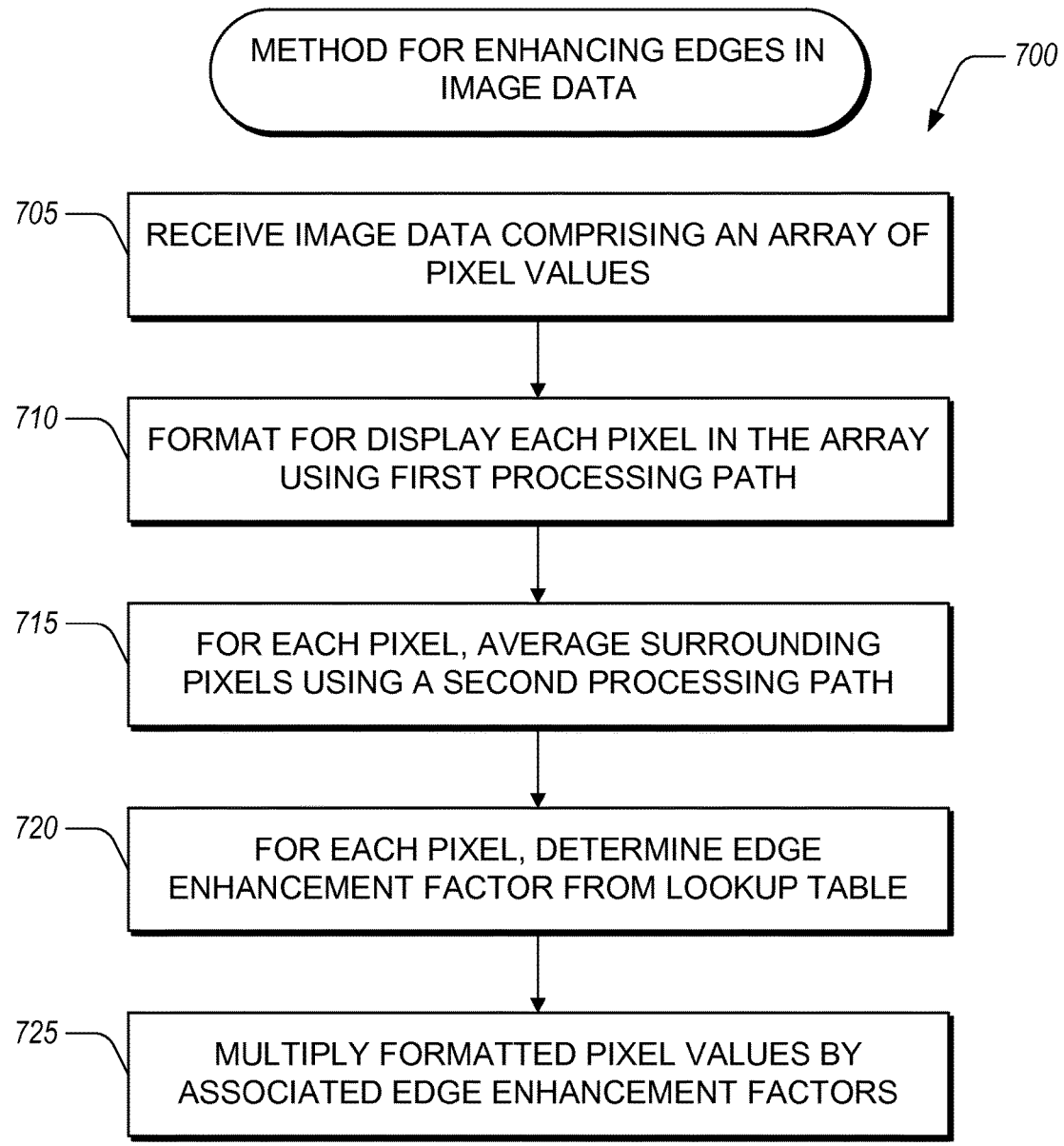
FIG. 7 illustrates a flow chart of an example method for enhancing edges in a digital image.

FIG. 7 illustrates a flow chart of an example method 700 for enhancing edges in a digital image. The method 700 can be implemented using one or more hardware components in an imaging system or image processing system. For ease of description, the method 700 will be described as being performed by the imaging system 100 described herein with reference to FIGS. 1A and 1B. However, one or more of the steps of the method 700 can be performed by any module or combination of modules in the imaging system 100. Similarly, any individual step can be performed by a combination of modules in the imaging system 100.

In block 705, the imaging system receives image data comprising an array of pixel values. In some embodiments, the pixel values, $P_{ij}$, represent a two-dimensional array of pixel values where the indices i and j are used to indicate a particular pixel value in the array. The image data can be acquired with an image sensor that is part of the imaging system. The image data can be received from a data storage or memory or directly through a signal processing path from the image sensor that acquired the image data. In certain implementations, the image data is acquired with a focal plane array of an infrared camera or thermal sensor.

In block 710, the image system formats the pixel data for display using a first signal processing path. The pixel values, $P_{ij}$, can be formatted for display so that the formatted pixel values correspond to a corresponding display system. For example, this can include matching or adjusting a dynamic range of the display-formatted pixel values to be compatible with the display system. As a particular example, the pixels can be converted to 8-bit grey scale for display from 14-bit digital data. The output can be a two-dimensional array of display-formatted pixel values, $Pd_{ij}$.

In block 715, the image system uses a second signal processing path to loop through individual pixels in the array of pixel values, $P_{ij}$, and to determine an average or mean value, $Pave_{ij}$, of the pixels surrounding or nearby the individual pixel. As a particular example, the values from at least the pixels adjacent to the individual pixel being processed can be used to determine the average or median value.

In block 720, the imaging system determines an edge enhancement factor for each pixel, $\alpha_{ij}$, using a lookup table (LUT). The LUT can use as input $P_{ij}$ and/or $Pave_{ij}$, for example. In some embodiments, the imaging system can further determine a value $\Delta_{ij} = P_{ij} - Pave_{ij}$. In some embodiments, the imaging system can further determine a normalized value equal to $\Delta_{ij}/\text{Pave}_{ij}$. In some embodiments, the imaging system can further add 1 to the normalized value $\Delta_{ij}/\text{Pave}_{ij}$. The LUT can use any of these calculated or determined values as input (e.g., $P_{ij}$, $\text{Pave}_{ij}$, $\Delta_{ij}$, $\Delta_{ij}/\text{Pave}_{ij}$, and/or $1+\Delta_{ij}/\text{Pave}_{ij}$). The LUT can be configured as described herein, such as, for example, as illustrated in FIGS. 5 and 6. However, the LUT can be configured differently from those example illustrations.

In block 725, the imaging system adjusts the display-formatted pixel values using the associated edge enhancement factors. For example, the adjusted or enhanced pixels, $Pe_{ij}$, can be a product of the display-formatted pixel values using the associated edge enhancement factors: $Pe_{ij}=Pd_{ij}*\alpha_{ij}$.

Example Low-Pass Filter to Smooth Portions of an Image

The data available from local contrast determination may be used to perform other image adjustments based on local contrast characteristics. For instance, it may be advantageous to perform an adjustment that is similar to a low pass filter. In this case, for pixels P that have adjusted pixel values, $\Delta$, within a tailored smoothing range, S, the adjusted pixel values, $\Delta$, for the nearest neighboring pixels may also be checked. The tailored smoothing range, S, can be configured so that a pixel within the range S is not likely part of an edge-type component in the image data. If the nearest neighbors are also within the tailored smoothing range, S, then it is very unlikely that an edge is present in this portion of the image data. Accordingly, it may be desirable to smooth out such regions of the image. One approach includes replacing the pixel value P (and/or the display-formatted pixel value $P_d$) with the average or the median of the nearest neighbors. This would have the effect of low pass filtering noise in low contrast local areas.

Figure 8:
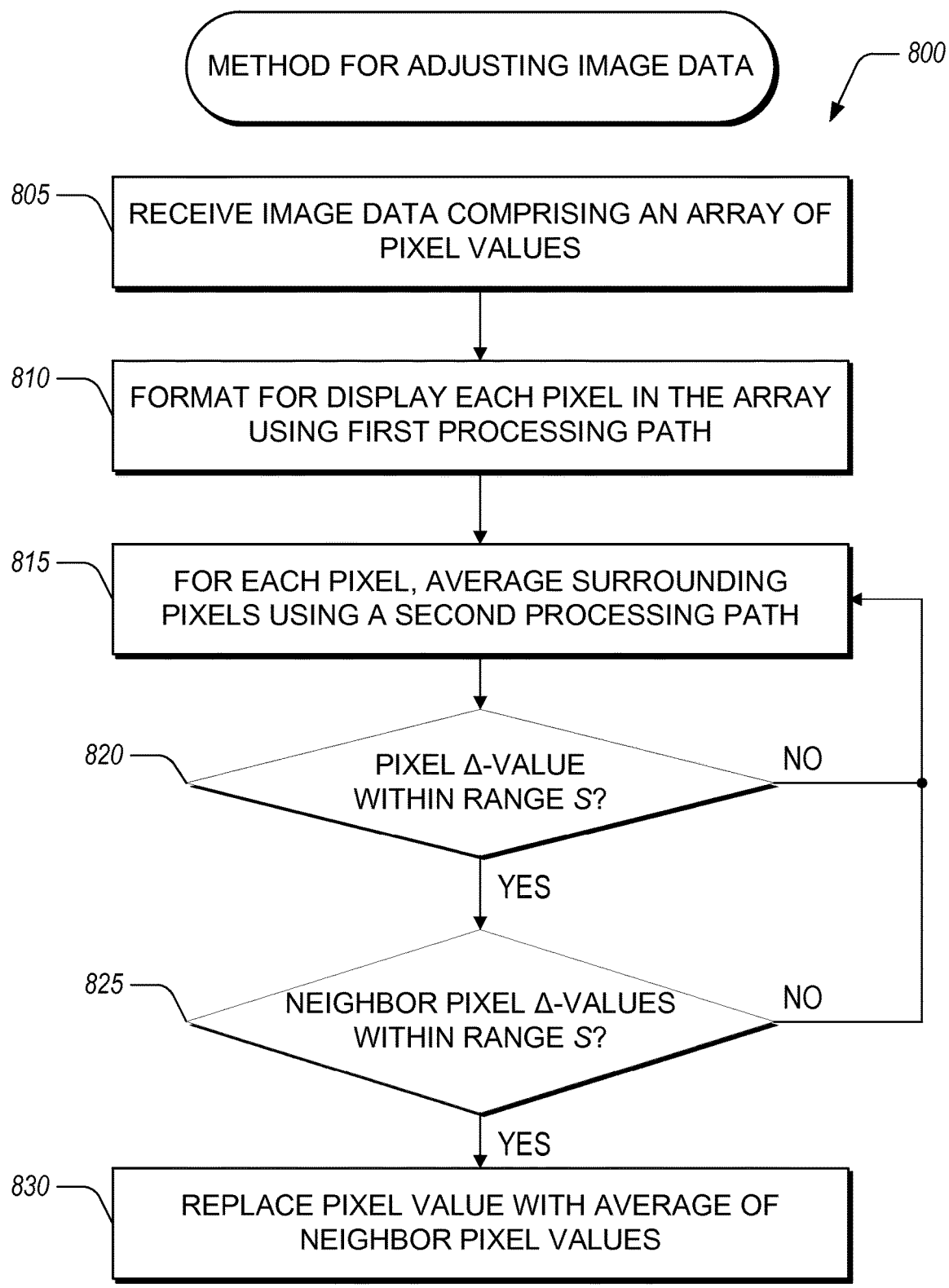
FIG. 8 illustrates a flow chart of an example method for smoothing portions of a digital image.

FIG. 8 illustrates a flow chart of an example method 800 for smoothing portions of a digital image. Similar to the method 700, the method 800 will be described as being performed by the imaging system for ease of description. In addition, blocks 805, 810, and 815 are the same as for the method 700.

In block 820, the imaging system determines whether the pixel delta value, $\Delta_{ij}$, is within a smoothing range S. The smoothing range can be configured so that a pixel delta-value within the range S is unlikely to be part of an edge in the image data. If the pixel delta value is within the smoothing range S, the imaging system proceeds to block 825 where it determines whether the neighboring pixels also have delta values within the range S. If the neighboring pixels also have delta values within the range S, then the imaging system proceeds to block 830 where it replaces the value of the pixel, $P_{ij}$ or $Pd_{ij}$, with an average or median value of the neighboring pixels.

Example Filter to Replace Misbehaving Pixels in an Image

A similar technique may be used to suppress pixels that are misbehaving, such as pixels that are flickering, dead, or where individual pixels are very bright or very dark relative to neighboring pixels. In this case, for a pixel whose adjusted pixel value, $\Delta$, is outside a bad pixel range, B, the adjusted pixel values, $\Delta$, of the neighboring pixels may also be checked. For any pixel whose adjusted pixel value, $\Delta$, is the only one of the neighbors that is outside the bad pixel range, B, then that single pixel may be unlikely to represent an edge and more likely is a bad pixel. For this case, rather than boosting or diminishing that pixel, the pixel value can be replaced with the average and/or median of its neighbors.

Figure 9:
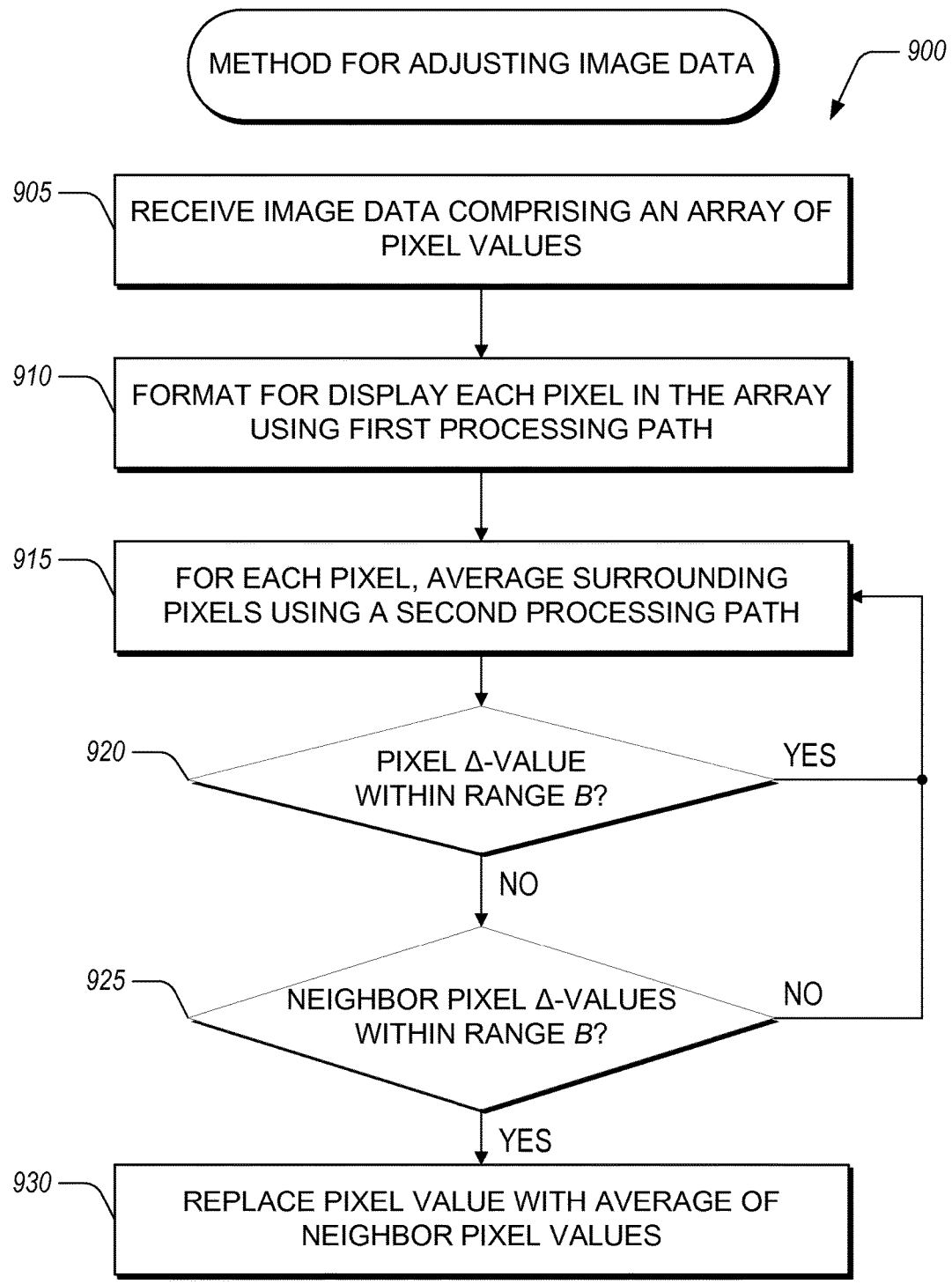
FIG. 9 illustrates a flow chart of an example method for identifying and replacing bad pixels in a digital image.

FIG. 9 illustrates a flow chart of an example method 900 for identifying and replacing bad pixels in a digital image. Similar to the methods 700 and 800, the method 900 will be described as being performed by the imaging system for ease of description. In addition, blocks 905, 910, and 915 are the same as for the method 700.

In block 920, the imaging system determines whether the adjusted pixel value, $\Delta_{ij}$, is within a bad pixel range B. The bad pixel range can be configured so that an adjusted pixel value outside of the range B is likely to be misbehaving (e.g., a dead pixel, a flickering pixel, a stuck pixel, etc.). If the adjusted pixel value is outside the bad pixel range B, the imaging system proceeds to block 925 where it determines whether the neighboring pixels have adjusted pixel values that are within the bad pixel range B. If the neighboring pixels have adjusted pixel values within the bad pixel range B while the pixel of interest does not, then it is very likely that the particular pixel is misbehaving and the pixel value is unreliable or inaccurate. In this case the imaging system proceeds to block 930 where it replaces the value of the pixel, $P_{ij}$ or $Pd_{ij}$, with an average or median value of the neighboring pixels.

It should be noted that the low-pass filter (e.g., smoothing portions of an image) and the technique to suppress the appearance of misbehaving pixels may be used along with edge enhancement. For example, for pixels that do not meet the above requirements and are outside the noise range, N, edge enhancement can be applied. In some embodiments, the low pass filter and/or the suppression of misbehaving pixels may be applied as filters without applying the edge enhancement filter. The filters and processing techniques disclosed herein involve adjustment of an image based at least in part on the character of the local contrast (e.g., the contrast between pixels near one another) and can be performed in conjunction with one another, independently of one another, and/or in conjunction with any of the other filters described herein without performing all described filtering processes.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for performing efficient edge enhancement of a digital image representing data from an infrared sensor, wherein the method is performed by a processor operating in association with a memory storing a computer program and at least one look up table (LUT), the method comprising;

receiving, by the processor, image data acquired with an infrared sensor, the image data comprising an imaging array of pixel values, $P_{ij}$;

formatting for display, using a first signal processing path of the processor, individual pixel values of the imaging array to generate an array of display-formatted pixel values, $Pd_{ij}$;

for individual pixels in the imaging array, determining, using a second signal processing path of the processor operating parallel to the first signal processing path, an average or median pixel value, $Pave_{ij}$, by averaging the values of pixels surrounding the individual pixel;

for individual pixels in the imaging array, retrieving an edge enhancement factor, $\alpha_{ij}$, from the at least one look up table (LUT) based on the value of the individual pixel, $P_{ij}$, and at least one of an average or median pixel value, $Pave_{ij}$, or an adjusted pixel value, $\Delta_{ij}$, where the adjusted pixel value is a difference between the pixel value, $P_{ij}$, and the average or median pixel value, $Pave_{ij}$;

for individual display-formatted pixel values, multiplying each image display-formatted pixel value, $Pd_{ij}$, by the edge enhancement factor, $\alpha_{ij}$, to generate an enhanced display-formatted array of pixel values, $Pe_{ij}$; and displaying an enhanced image based on the enhanced display-formatted array of pixel values, $Pe_{ij}$, on a display.

2. The method of claim 1, wherein formatting for display comprises utilizing histogram equalization based methods (HEBM) where $Pd_{ij}$ is grey scale display-formatted data.

3. The method of claim 1, wherein the edge enhancement factor is 1 if the adjusted pixel value, $\Delta_{ij}$, is within a noise range N.

4. The method of claim 3, wherein the noise range N is symmetrical about 0 such that the adjusted pixel value, $\Delta_{ij}$, is within the noise range N when $-Nr \leq \Delta_{ij} \leq Nr$.

5. The method of claim 4, wherein the edge enhancement factor, $\alpha_{ij}$, is set to 1 without performing a LUT operation to retrieve the edge enhancement factor, $\alpha_{ij}$, if the adjusted pixel value, $\Delta_{ij}$, is within the noise range N, wherein the LUT does not contain entries for the case where $-Nr < \Delta_{ij} < Nr$.

6. The method of claim 4, wherein the value of Nr is between 1 and 10 counts.

7. The method of claim 4, wherein the edge enhancement factor, $\alpha_{ij}$, is set to a constant value if the adjusted pixel value, $\Delta_{ij}$, is outside an enhancement limit range M.

8. The method of claim 7, wherein the enhancement limit range M is symmetrical about 0 such that the adjusted pixel value, $\Delta_{ij}$, is within the enhancement range M when $-Mr \leq \Delta_{ij} \leq Mr$.

9. The method of claim 8, wherein the edge enhancement factor, $\alpha_{ij}$, is directly set to a constant value without performing a LUT operation to retrieve the edge enhancement factor, $\alpha_{ij}$, if the adjusted pixel value, $\Delta_{ij}$, is outside the enhancement limit range M, wherein the LUT does not contain entries for the cases where $\Delta_{ij} < -Mr$ and $\Delta_{ij} > Mr$.

10. The method of claim 9, wherein the edge enhancement factor, $\alpha_{ij}$, is set to a value $C_L$ if $\Delta_{ij} < -Mr$, set to a value $C_H$ if $\Delta_{ij} > +Mr$, set to a value that varies from $C_L$ to 1 when $-Mr < \Delta_{ij} < -Nr$, and set to a value that varies from 1 to $C_H$ when $+N_r < \Delta_{ij} < +M_r$.

11. The method of claim 10, wherein the LUT uses as input a normalized, adjusted pixel value, $\Delta_{ij}/Pave_{ij}$.

12. The method of claim 10, wherein $C_L$ is 0.25 and $C_H$ is 4.

13. The method of claim 10, wherein $C_L$ is 0.5 and $C_H$ is 2.

14. The method of claim 3, wherein the noise range N is configured to discriminate between noise/low variation regions and true edges.

15. The method of claim 1, wherein the LUT uses as input a normalized, adjusted pixel value, $\Delta_{ij}/Pave_{ij}$.

16. The method of claim 1 further comprising, using the second signal processing path:
looking up values of $1/Pave_{ij}$ in a Pave lookup table for individual pixels;
calculating a normalized, adjusted pixel value, $\Delta_{ij}/Pave_{ij}$; and
looking up values of the edge enhancement factor, $\alpha_{ij}$, for individual pixels, the edge enhancement factor, $\alpha_{ij}$, corresponding to the adjusted pixel value, $\Delta_{ij}/Pave_{ij}$, in the LUT different from the Pave lookup table.

17. The method of claim 16 further comprising converting the imaging array of pixel values, $P_{ij}$, to a corresponding array of 32-bit fixed point formatted values for processing in fixed point arithmetic.

18. The method of claim 17 further comprising adding 1 to $\Delta_{ij}/Pave_{ij}$ and looking up values of the edge enhancement factor, $\alpha_{ij}$, corresponding to $1+\Delta_{ij}/Pave_{ij}$ in the LUT.

19. The method of claim 1, wherein the infrared sensor comprises an infrared focal plane array in a thermal imaging camera.

* * * * *